Feb. 7, 1933.   T. F. THOMPSON   1,896,472
SEMIAUTOMATIC FREE WHEELING TRANSMISSION
Filed Oct. 13, 1931   3 Sheets-Sheet 2

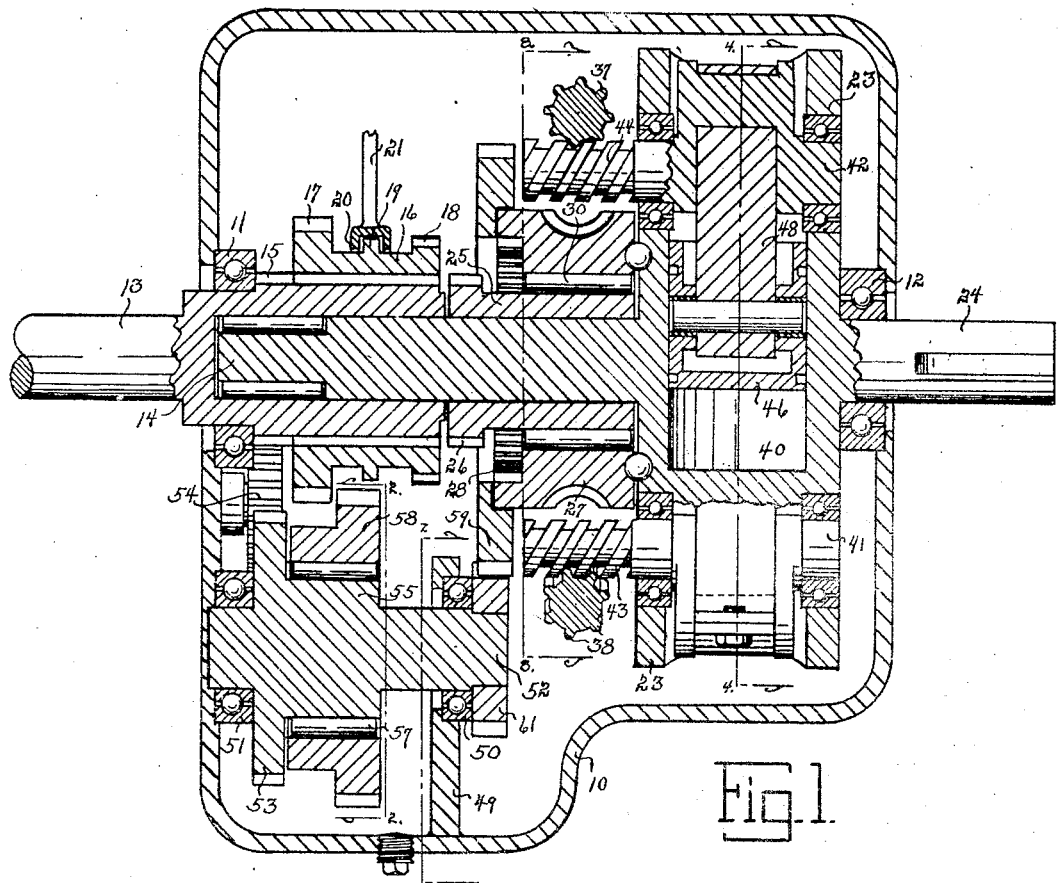

INVENTOR.
T. F. THOMPSON
BY M. Talbert Dick
ATTORNEY.

Feb. 7, 1933.  T. F. THOMPSON  1,896,472
SEMIAUTOMATIC FREE WHEELING TRANSMISSION
Filed Oct. 13, 1931  3 Sheets-Sheet 3

INVENTOR.
T. F. THOMPSON
BY
M. Talbert Dick
ATTORNEY.

Patented Feb. 7, 1933

1,896,472

UNITED STATES PATENT OFFICE

THEODORE F. THOMPSON, OF FORT DODGE, IOWA, ASSIGNOR TO IDA M. THOMPSON, OF WEST IOWA LAKE, IOWA

SEMIAUTOMATIC FREE WHEELING TRANSMISSION

Application filed October 13, 1931. Serial No. 568,557.

The principal object of my invention is to provide a freewheeling transmission for automotive vehicles which will automatically go into a high gear from low gear when a predetermined speed or load pull is obtained and will also automatically return to a lower gear when the speed is decreased below or the load pull increased beyond that predetermined speed for the higher gear.

A further object of this invention is to provide a semi-automatic transmission for vehicles such as automobiles, trucks and the like, that delivers an uninterrupted power while the automatic phase of the transmission is progressing from low to a higher gear or from a higher gear to a lower gear.

A still further object of my invention is to provide a transmission for motor vehicles or the like that eliminates the necessity of actuating the clutch of the vehicle when the transmission changes from one gear to another gear.

A still further object of this invention is to provide a semi-automatic freewheeling transmission that is positive in its function and quiet in operation.

A still further object of my invention is to provide a freewheeling semi-automatic transmission that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 1 is a side sectional view of my complete invention in use.

Fig. 2 is a rear end view of one of the reverse gears also showing the clutch assembly and is taken on line 2—2 of Fig. 1.

Fig. 3 is a side view of the main worm wheel for operating the governor portion of the invention.

Figure 4:
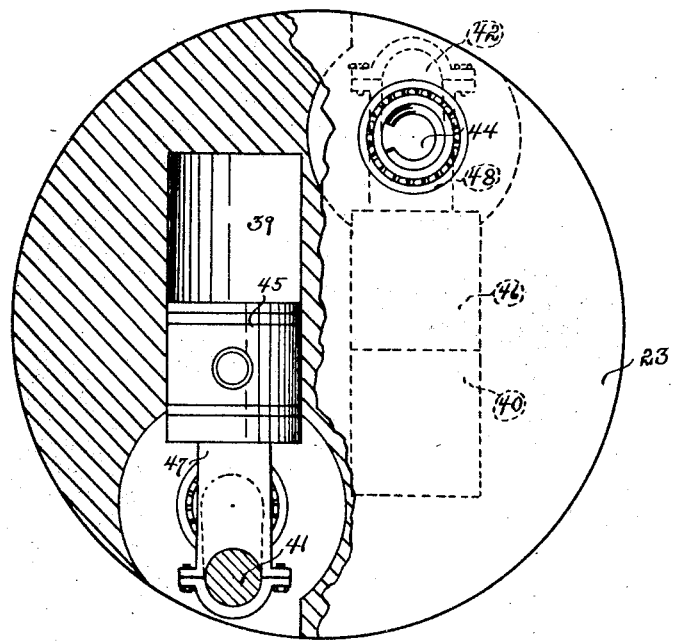
Fig. 4 is an end sectional view of the governor taken on line 4—4 of Fig. 1.

As is well known the transmissions now being used on automotive vehicles such as automobiles, trucks and the like require the manual shifting of the transmission from one gear to the other gear. In most of these transmissions it is necessary for the operator of the vehicle to disengage the clutch during the gear changing function. This means that at the time the transmission is being manually actuated there is no transmission of power from the motor of the vehicle to the traction wheels of the vehicle and we must depend upon the rolling momentum of the vehicle while the clutch is disengaged and the gear shifting is being accomplished. In hilly country this condition not only is undesirable but endangers lives and property. This is also true in congested traffic when both hands of the vehicle operator should be engaged in guiding and manipulating the vehicle. My transmission not only overcomes these disadvantages as will hereinafter be apparent but provides freewheeling, the results and desirability of which are well known.

I have used the numeral 10 to designate the complete housing in which my invention resides. This housing also serves as a container for the usual transmission oil or grease. Secured on the front and rear ends of the housing 10 are the usual bearing members 11 and 12, positioned opposite from each other. The numeral 13 designates a shaft rotatably mounted in the bearing member 11 and designed to be in operative connection with the prime mover of the vehicle. The numeral 14 designates a second shaft inside the housing 10. This shaft 14 extends into and is rotatably mounted in the rear end portion of the shaft 13 that is inside the housing 10, as shown in Fig. 1. The numeral 15 designates transversely arranged gear teeth on the outer periphery of the end portion of the shaft 13 that extends into the housing 10.

Figure 5:
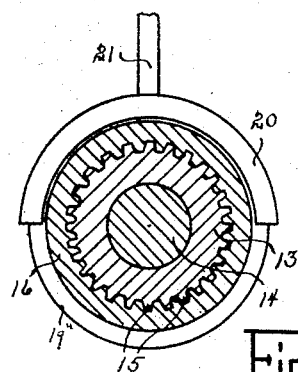
Fig. 5 is an end sectional view of the manually operated shift gear of the invention.
Figure 6:
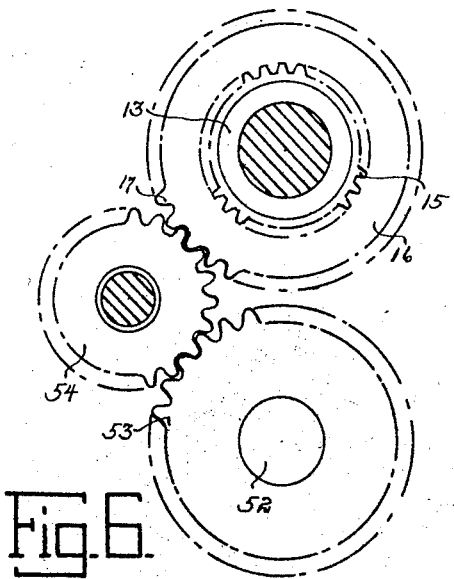
Fig. 6 is a front end view of the reversing gear assembly.
Figure 7:
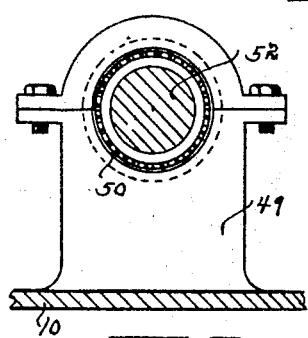
Fig. 7 is a front end sectional view of one of the bearing housings for the reversing gear and taken on line 7—7 of Fig. 1.
Figure 10:
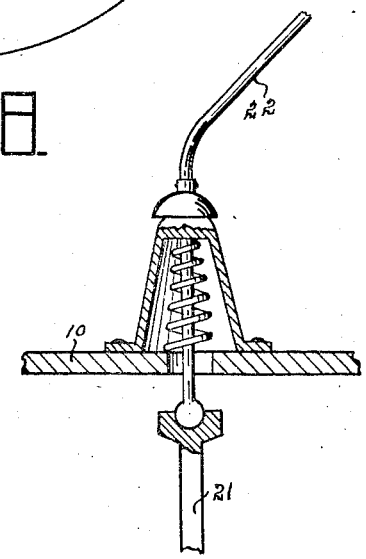
Fig. 10 is a side sectional view of the gear shift lever.
Figure 11:
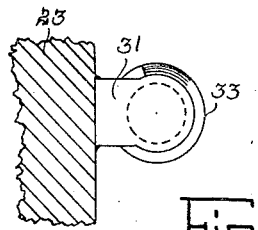
Fig. 11 is an end plan sectional view of one of the bearing members for holding the worm gears which drive the governor and taken on line 11—11 of Fig. 8.

The numeral 16 designates an internally toothed sleeve slidably mounted on the rear end portion of the shaft 13 and engaging the teeth 15, as shown in Fig. 5. The numeral 17 designates a toothed gear on the forward end portion of the sleeve 16. The numeral 18 designates a second toothed gear but on the rear end portion of the sleeve 16. The numeral 19 designates a peripheral flange on the central portion of the sleeve 16 and positioned between the gears 17 and 18. This flange 19 is loosely embraced and engaged by the yoke 20. The numeral 21 designates an arm rigidly secured to the yoke 20. This arm 21 extends upwardly and is operatively connected to the usual gear shift hand lever 22, as shown in Fig. 10. The numeral 23 designates the circular governor base block integrally formed on the rear end of the shaft 14 and spaced from the rear end of the shaft 13. The numeral 24 designates a third shaft integrally formed on the rear side of the governor base block. This shaft 24 is rotatably mounted in the bearing member 12 and is in the same plane with the second shaft 14. The numeral 25 designates a collar loosely embracing the shaft 14 and positioned between the end of the shaft 13 and the governor base block, as shown in Fig. 1. The numeral 26 designates a toothed gear integrally formed on the forward end of the collar 25. This toothed gear 26 is of the same diameter as the toothed gear 15 formed on the periphery of the rear end portion of the shaft 13 and is capable of being engaged by the internal teeth of the sleeve 16. The numeral 27 designates a worm gear wheel rotatably mounted around the collar 25. The numeral 28 designates an internal ring gear integrally formed on the forward side of the worm gear wheel 27. This internal ring gear is capable of being meshed by the external toothed gear 18.

Figure 8:
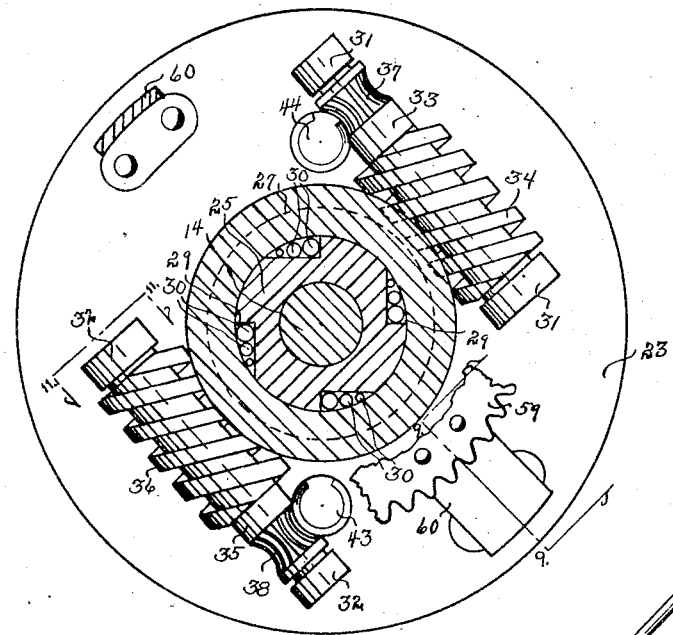
Fig. 8 is an end view of the governor driving mechanism taken on line 8—8 of Fig. 1.
Figure 9:
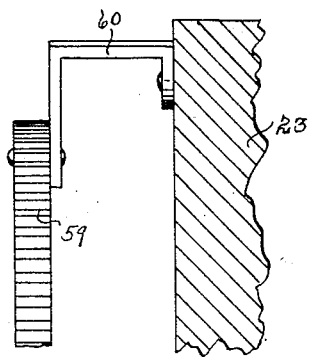
Fig. 9 is a side sectional view showing the brackets by which the main drive gear is secured to the governor housing and taken on line 9—9 of Fig. 8.

The numeral 29 designates notches formed in the periphery of the collar 25. Each of these notches has one of its sides extending approximately in a radial line to the collar and its other side extending at an angle from the extreme bottom of the notches to the periphery of the collar, as shown in Fig. 8. Loosely mounted in each of these notches 29 are the usual plurality of wedge rollers 30, tapering in diameter as they extend from the extreme depth of the notches in which they reside. By this arrangement, when the collar 25 is rotated to the right, the wedge rollers will tend to move to the left in their notches and by so doing, will wedge tightly between the collar 25 and the worm gear wheel rotatably mounted thereon, thereby preventing further independent rotation of the collar relative to the worm gear wheel. On the other hand, if the worm gear wheel is rotated to the right relative to the collar 25, there will be no wedging action, as the rollers 30 will be moved to the greatest depths of the notches 29. These elements just explained are the freewheeling portion of my invention and are well known to the art. The numerals 31 and 32 designate two pairs of spaced apart bearing members rigidly secured to the forward face of the governor base block, as shown in Fig. 1. Rotatably mounted in the bearing member 31 is a small shaft 33 having spiraled worm gear teeth 34 on its periphery and engaging the teeth of the worm gear wheel 27. The numeral 35 designates a duplicate small shaft rotatably mounted in the bearing members 32 and having spiraled worm gear teeth 36 on its periphery engaging the teeth of the worm gear wheel 27, but at points diametrically opposite from the points of contact made by the spiraled worm gear teeth 34. The numeral 37 designates concave elongated worm gear teeth on the shaft 33.

The numeral 38 designates similar concave worm gear teeth on the shaft 35. The numeral 39 designates a bore in the governor base block opening on the periphery of the block. The numeral 40 designates a similar bore opening on the periphery of the governor base block, but extending diametrically opposite from that of the bore 39, as shown in Fig. 1. The numeral 41 designates a crank shaft rotatably mounted in the governor base block and operating in and near the entrance of the bore 39. The numeral 42 designates a similar crank shaft rotatably mounted in the governor base block, but operating in and near the entrance of the bore 40. The numeral 43 designates an elongated worm gear integrally formed on the crank shaft 41 and in engagement with the worm gear teeth 38, as shown in Fig. 1 and Fig. 8. The numeral 44 designates a similar elongated worm gear, but integrally formed on the crank shaft 42 and engaging the worm gear teeth 37. The numerals 45 and 46 designate pistons slidably mounted for reciprocation in the bores 39 and 40. The numeral 47 designates a connecting rod operatively connecting the piston 45 with the crank shaft 41. The numeral 48 designates a connecting rod for operatively connecting the crank shaft 42 with the piston 46. By this arrangement, the rotation of the collar 25 to the right will have a tendency to reciprocate the pistons 45 and 46. The numeral 49 designates a bearing housing for supporting the bearing member 50. The numeral 51 designates a similar bearing member rigidly supported by the housing 10. The numeral 52 designates a shaft rotatably mounted in the bearing members 50 and 51. The numeral 53 designates a toothed gear integrally formed on the forward end portion of the shaft 52. The numeral 54 designates a rotatably mounted idler gear inside the housing 10 and in mesh with the gear 53.

This idler gear 54 is so positioned in the housing 10 as to be capable of being meshed also by the gear 17. The numeral 55 designates a collar integrally formed around the shaft 52. The numeral 56 designates a plurality of notches formed in the periphery of the collar 55. Each of these notches has one of its sides extending approximately in a radial line relative to the collar and its other side extending at an angle from the extreme bottom of the notch to the periphery of the collar, as shown in Fig. 2. Loosely mounted in each of these notches are a plurality of wedge rollers 57, decreasing in diameter as they extend from the extreme depth of the notch in which they are positioned. By this arrangement, when the collar 55 is rotated to the left the wedge rollers 57 will tend to move to the right in their notches and by so doing, will wedge between the collar 55 and the spur gear 58, which is rotatably mounted around the collar 55, as shown in Fig. 1. On the other hand, when the spur gear 58 is rotated to the left relative to the collar 55, the wedge rollers will tend to move toward the radial walls of the notches and no wedging action will take effect. The numeral 59 designates a large spur gear rigidly secured to the forward face of the governor base block by brackets 60. The numeral 61 designates a small spur gear rigidly secured on the shaft 52 and in engagement with the large gear 59.

The practical operation of the invention is as follows. By pushing the operation lever 22 forwardly the sleeve 16 will be moved to the rear and the gear teeth 17 will engage the spur gear 58. As the sleeve 16 is provided with internal gear teeth, these internal gear teeth will be moved into engagement with the gear teeth 26. This means that the shaft 13, which is operatively connected to the prime mover, will be rigidly connected to the collar 25 and the spur gear 58.

With the shaft 13 rotating to the right, the collar 25 will be rotated to the right and two actions will take place, i. e., a tendency to reciprocate the pistons 45 and 46 and a tendency to rotate the governor base block at the same speed as and with the shaft 13. As the spline shaft 24 is rigidly secured to the governor base block its function will be to always turn with the governor base block. This shaft 24 is designed to be operatively connected to the traction wheels of the vehicle using my transmission. If, in the case of freewheeling, where the traction wheels are running ahead of the prime mover, the shaft 24 may rotate faster than the shaft 13 due to the wedge rollers 30 which I have already explained. However, due to the fact that the shaft 13 is definitely connected to the spur gear 58 still another definite action takes place in the transmission, i. e., the positive connection of the shaft 13 to the governor base block by reduction gears. This is made possible by the shaft 52, which is rotated by the shaft 13, having a comparatively small spur gear 61 in engagement with the comparatively large spur gear 59, which is secured directly to the governor base block by the brackets 60. The result of the operation of all of these parts is that the transmission will never fall below "low gear," but may automatically progress to "high gear," which means that the shaft 24 is rotating at the same speed or at a faster speed than the shaft 13. Any freewheeling of the transmission is still possible, despite the reduction gears, by the employment of the wedge rollers 57, which I have herebefore thoroughly discussed. When the vehicle reaches a predetermined speed, or a lack of load pull is experienced on the shaft 24, the resistance set up by the reciprocation of the compression pistons will eliminate the low gear originally experienced and the governor base block will rotate with the shaft 13 with the pistons remaining stationary. The resistance set up by the reciprocation of the compression pistons will depend upon the close fitting of the pistons inside their cylinder walls. In order that too great a resistance will not be set up, the pistons should be so constructed as to permit a certain amount of leakage. Air passageways (not shown in the drawings) communicating with the inside of the piston bores and the outside atmosphere may also be used to permit a more free reciprocation of the pistons.

This result of running ahead of the reduction gears is also possible due to the wedge rollers 57. From a study of the functions of the elements it will readily be noted that there will not be a quick change from a lower gear to a higher gear, but will be gradual and will be relative to the slowing up of the reciprocation of the compression pistons.

If it is desired to eliminate the freewheeling made possible by the wedge rollers 30 it is merely necessary to push the lever 22 still further to the front, thereby moving the sleeve 16 to such a position that the teeth 18 on its periphery will contact and engage the internal ring gear 28.

When it is desired to place the transmission in reverse, it is merely necessary to move the lever 22 to the rear in order that the gear teeth 17 will engage the teeth of the small idler 54. As the idler 54 is also in engagement with the spur gear 53, the shaft 52 will be rotated in an opposite direction to the direction of rotation of the shaft 13. With the spur gear 61 being in positive engagement with the spur gear 59, the shaft 24 will be rotated in a reverse direction and at a much lower speed than the speed of rotation of the shaft 13, which is desirable for reverse.

When it is desired to place the transmission in neutral, it is merely necessary to move the lever 22 to such a position to cause the sleeve 16 to assume its position, as shown in Fig. 1.

From the foregoing, it will readily be appreciated that I have provided a novel freewheeling transmission that will go from one gear to another without affecting the delivery of a continuous power from the motor to the traction wheels.

Although I have described my transmission as particularly adapted for use in combination with automotive vehicles, it may be used to equal advantage in any situation where such a transmission is desired.

Some changes may be made in the construction and arrangement of my improved semi-automatic freewheeling transmission without departing from the real spirit and purpose of my invention, and it is my intention to cover by my claims any modified forms of structure or use of mechanical equivalents which may be reasonably included within their scope.

I claim:

1. In a device of the class described, a shaft designed to have one of its ends operatively connected to a prime mover, a second shaft in alinement with said first mentioned shaft, a collar rotatably mounted on said second shaft, a gear wheel rotatably mounted on said collar, a means for rigidly locking said collar to said gear wheel when said collar is rotated in one direction, a governor base block secured to said second shaft, a bore in said governor base block, a compression piston slidably mounted in said bore, a crank shaft rotatably mounted in said governor base block operatively connected to said compression piston, gears for operatively connecting said gear wheel to said crank shaft, a third shaft secured to said governor base block, a fourth shaft positioned at one side of said first mentioned shaft, a spur gear rotatably mounted on said fourth shaft, a means for rigidly securing said last mentioned gear to said fourth shaft when rotated in one direction, a comparatively small spur gear rigidly secured on said fourth shaft, a comparatively large spur gear rigidly secured to said governor base block and in mesh with said comparatively small spur gear, and a manually operated means for securing said collar and said first mentioned spur gear to said first mentioned shaft.

2. In a device of the class described, a shaft designed to have one of its ends operatively connected to a prime mover, a rotatably mounted collar, a wheel, a means for locking said collar to said wheel when said collar is rotated in one direction, a second shaft, a block rigidly secured to said second shaft, a bore in said block having one end closed, a compression piston slidably mounted in said bore, a crank shaft rotatably mounted in said block operatively connected to said compression piston, a means for operatively connecting said wheel to said crank shaft, a third shaft, a second rotatably mounted wheel, a means for locking said last mentioned wheel and said last mentioned shaft against independent rotation in one direction when said wheel is rotated in one direction, a comparatively large gear rigidly secured to said block, a comparatively small gear rigidly secured to said third shaft and in mesh with said comparatively large gear, and a manually operated means for securing said collar and said second mentioned wheel to said first mentioned shaft.

3. In a device of the class described, a shaft designed to have one of its ends operatively connected to a prime mover, a rotatably mounted collar, a wheel, a means for locking said collar to said wheel when said collar is rotated in one direction, a second shaft, a block rigidly secured to said second shaft, a bore in said block having one end closed, a compression piston slidably mounted in said bore, a crank shaft rotatably mounted in said block operatively connected to said compression piston, a means for operatively connecting said wheel to said crank shaft, a third shaft, a second rotatably mounted wheel, a means for locking said last mentioned wheel and said last mentioned shaft against independent rotation in one direction when said wheel is rotated in one direction, a comparatively large gear rigidly secured to said block, a comparatively small gear rigidly secured to said third shaft and in mesh with said comparatively large gear, a second gear rigidly secured to said third shaft, and a manually operated means for selectively securing said first mentioned shaft to said collar and second mentioned wheel or to said second mentioned gear on said third shaft.

4. In a device of the class described, a shaft designed to have one of its ends operatively connected to a prime mover, a second shaft in alinement with said first mentioned shaft, a collar rotatably mounted on said second shaft, a worm gear wheel rotatably mounted on said collar, a means for rigidly locking said collar against independent rotation relative to said worm gear in one direction when said collar is rotated in one direction, a governor base block secured to said second shaft, a bore in said governor base block having one end closed, a piston slidably mounted in said bore, a crank shaft rotatably mounted in said governor base block operatively connected to said piston, an elongated spiraled gear rotatably mounted on said base block and meshing with said worm gear wheel, worm gear teeth on said elongated spiraled gear, a second elongated spiraled gear secured to said crank shaft and meshing with the worm gear teeth on said first mentioned elongated spiraled gear, a third shaft secured to said governor base block, a fourth shaft, a spur gear rotatably mounted on said fourth shaft, a means for rigidly locking said last mentioned gear against independent rotation in one direction relative to said fourth shaft when said gear is rotated in one direction, gears for operatively connecting said fourth shaft to said third shaft, and a manually operated means for rigidly securing said collar and said first mentioned spur gear to said first mentioned shaft.

5. In a device of the class described, a shaft designed to have one of its ends operatively connected to a prime mover, a second shaft in alinement with said first mentioned shaft, a collar rotatably mounted on said second shaft, a wheel rotatably mounted on said collar, a means for rigidly locking said collar against independent rotation in one direction relative to said wheel when said collar is rotated in one direction, a third shaft in the same plane with said first mentioned shaft, a means for yieldingly preventing the independent rotation of said wheel and said third mentioned shaft in one direction, reduction gears operatively connected to said third shaft, and a manually operated means for securing said first mentioned shaft with said collar and said reduction gears.

6. In a device of the class described, a shaft designed to have one of its ends operatively connected to a prime mover, a second shaft in alinement with said first mentioned shaft, a collar rotatably mounted on said second shaft, a wheel rotatably mounted on said collar, a means for rigidly locking said collar against independent rotation in one direction relative to said wheel when said collar is rotated in one direction, a third shaft in the same plane with said first mentioned shaft, a means for yieldingly preventing the independent rotation of said wheel and said third mentioned shaft in one direction, external gear teeth on said collar, external gear teeth on said first mentioned shaft, an internal ring gear secured to said wheel, a fourth shaft, a spur gear rotatably mounted on said fourth shaft, a means for rigidly locking said spur gear against independent rotatation relative to said fourth shaft in one direction when said spur gear is rotated in one direction, reduction gears operatively connecting said fourth shaft with said third shaft, a sleeve slidably mounted on said first mentioned shaft, internal gear teeth on said sleeve meshing with the teeth on said first mentioned shaft, a set of gear teeth on said sleeve, a second set of gear teeth on said sleeve, gear teeth on said fourth shaft, an idler gear in mesh with said last mentioned teeth, and a manually operated means for selectively sliding said sleeve to engage said external teeth on said collar and said first mentioned set of teeth on said collar into engagement with said first mentioned spur gear; said internal gear teeth of said collar into engagement with the external teeth on said collar and said second set of teeth on said collar into engagement with said internal gear on said wheel; and said second set of teeth on said sleeve into engagement with said idler.

7. In a device of the class described, a shaft designed to have one of its ends operatively connected to a prime mover, a second shaft in alinement with said first mentioned shaft, a collar rotatably mounted on said second shaft, a worm gear rotatably mounted on said collar, a means for rigidly locking said collar against independent rotation relative to said worm gear in one direction when said collar is rotated in one direction, a block secured to said second shaft, two oppositely extending bores in said block, a piston slidably mounted in each of said bores, a rotatably mounted crank shaft for actuating each of said pistons, two elongated spiraled gear members rotatably mounted on said block and meshing with said worm gear, worm gear teeth on each of said elongated spiraled gear members, an elongated spiraled gear secured to one of said crank shafts and meshing with the worm gear teeth on one of said elongated spiraled members, an elongated spiraled gear secured to the other crank shaft and meshing with the worm gear teeth on the other elongated spiraled gear member, a third shaft secured to said block, a fourth shaft, a spur gear rotatably mounted on said fourth shaft, a means for rigidly locking said last mentioned gear against independent rotation in one direction relative to said fourth shaft when said gear is rotated in one direction, gears for operatively connecting said fourth shaft to said third shaft, and a manually operated means for rigidly securing said collar and said first mentioned spur gear to said first mentioned shaft.

8. In a device of the class described, a housing, a shaft rotatably mounted in said housing, a second shaft in said housing, a collar rotatably mounted on said second shaft, a wheel rotatably mounted on said collar, a means for rigidly locking said collar against independent rotation in one direction relative to said wheel when said collar is rotated in one direction, a third shaft rotatably mounted in said housing and in the same plane with said first mentioned shaft, a means for yieldingly preventing the independent rotation of said wheel and said third mentioned shaft in one direction when said wheel is rotated in one direction at a greater speed than the speed of rotation of the third mentioned shaft, a fourth shaft, a wheel rotatably mounted on said fourth shaft, a catch means for locking said wheel to said fourth shaft when said wheel is rotated in one direction at a speed greater than the speed of rotation of said fourth shaft, reduction gears for operatively connecting said fourth shaft with said third shaft, and a manually operated means for securing said first mentioned shaft to said collar and said last mentioned wheel.

9. In a device of the class described, a housing, a shaft rotatably mounted in said housing, a rotatably mounted collar, a wheel, a means for locking said collar to said wheel when said collar is rotated in one direction relative to said wheel, a second shaft, a block rigidly secured to said second shaft, a bore in said block having one end closed, a piston slidably mounted in said bore, a crank shaft rotatably mounted in said block operatively connected to said piston, a means for operatively connecting said wheel to said crank shaft, a third shaft rotatably mounted in said housing, a second rotatably mounted wheel, a means for locking said last mentioned wheel and said last mentioned shaft against independent rotation in one direction when said wheel is rotated in one direction, a comparatively large gear rigidly secured to said block, a comparatively small gear rigidly secured to said third mentioned shaft and in mesh with said comparatively large gear, a second gear rigidly secured to said third mentioned shaft, an idler gear in mesh with said second gear on said third shaft, and a manually operated slidable means for selectively securing said first mentioned shaft to said collar and said second mentioned wheel at times and to said idler at times.

THEODORE F. THOMPSON.